(12) United States Patent
Krahn et al.

(10) Patent No.: US 6,483,981 B1
(45) Date of Patent: Nov. 19, 2002

(54) SINGLE-CHANNEL ATTENUATORS

(75) Inventors: Janet L. Krahn, Schenectady, NY (US); Kwok Pong Chan, Troy, NY (US); David G. Gascoyne, Schenectady, NY (US); Gregory A. Wagoner, Watervliet, NY (US)

(73) Assignee: Molecular OptoElectronics Corp., Watervliet, NY (US)

( * ) Notice: Subject to any disclaimer, the term of this patent is extended or adjusted under 35 U.S.C. 154(b) by 229 days.

(21) Appl. No.: 09/605,110

(22) Filed: Jun. 28, 2000

(51) Int. Cl.$^7$ ................................................ G02B 6/00
(52) U.S. Cl. ........................ 385/140; 385/40; 385/145
(58) Field of Search .......................... 385/140, 40, 43, 385/48, 50, 128, 142, 143, 144, 145

(56) References Cited

U.S. PATENT DOCUMENTS

| 3,328,323 A | 6/1967 | Vaughn | 260/18 |
| 4,060,308 A | 11/1977 | Barnoski et al. | 350/96 C |
| 4,201,446 A | 5/1980 | Geddes et al. | 350/96.29 |
| 4,343,532 A | 8/1982 | Palmer | 350/96.19 |
| 4,387,954 A | 6/1983 | Beasley | 350/96.15 |
| 4,469,544 A | 9/1984 | Goodman | 156/345 |

(List continued on next page.)

FOREIGN PATENT DOCUMENTS

| DE | 4005557 A1 | 8/1991 |
| DE | 4343943 A1 | 6/1995 |
| EP | 0229456 A2 | 7/1987 |
| EP | 0 488 266 A2 | 6/1992 |
| EP | 0686867 A1 | 12/1995 |
| EP | 0919583 A2 | 6/1999 |
| EP | 1035680 A2 | 9/2000 |

(List continued on next page.)

OTHER PUBLICATIONS

Bergh, R. A. et al., "Single–Mode Fibre Optic Directional Coupler," *Electron. Lett.*16 (7), 260–261 (Mar. 1980).

Birks, T.A. and Li, Y.W., "The Shape of Fiber Tapers," *IEEE J. Lightwave Techn.*10 (4), 432–438 (Apr. 1992).

Brophy, T.J. et al., "Formation and Measurement of Tapers in Optical Fibers," *Rev. Sci. Instrum.*64 (9), 2650–2654 (Sep. 1993).

Carrara, S. L. A. et al., "Elasto–Optic Alignment of Birefringent Axes in Polarization–Holding Optical Fiber," *Opt. Lett.*11, (7), 470–472 (Jul. 1986).

Cordaro, M. H. et al., "Precision Fabrication of D–Shaped Single–Mode Optical Fibers by In Situ Monitoring,"*IEEE J. Lightwave Techn.,*12, (9) 1524–1531 (Sep. 1994).

Diez A. et al., "Cynlindrical Metal–Coated Optical Fibre Devices for Filters and Sensors," *Electon. Lett.*32 (15), 1390–1392 (Jul. 1996).

Digonnet, M. J. F., et al., "Measurement of the Core Proximity in Polished Substrates and Couplers," *Opt. Lett.*10 (9), 463–465 (Sep. 1985).

(List continued on next page.)

*Primary Examiner*—Hemang Sanghavi
(74) *Attorney, Agent, or Firm*—Heslin Rothenberg Farley & Mesiti P.C.; Martha L. Boden, Esq.

(57) ABSTRACT

Novel attenuators for use in single-channel applications are disclosed. The attenuators include a crosslinked siloxane copolymer composition, prepared by crosslinking a vinyl-terminated dimethylsiloxane-diphenylsiloxane copolymer with a silane crosslinking agent in the presence of a platinum catalyst. The crosslinked copolymer overlies a portion of a side-polished optical fiber or tapered optical fiber. Optical energy propagating through the fiber can be extracted when the refractive index of the crosslinked material is varied about that of the optical fiber. The attenuators are useful in single-channel applications, such as the ever-popular 1310 nm and 1550 nm wavelengths.

17 Claims, 3 Drawing Sheets

U.S. PATENT DOCUMENTS

| | | | |
|---|---|---|---|
| 4,469,554 A | 9/1984 | Turner | 156/657 |
| 4,630,884 A | 12/1986 | Jubinski | 350/96.15 |
| 4,630,890 A | 12/1986 | Ashkin et al. | 350/96.3 |
| 4,704,151 A | 11/1987 | Keck | 65/4.1 |
| 4,712,866 A | 12/1987 | Dyott | 350/96.3 |
| 4,753,497 A | 6/1988 | Fujii et al. | 350/96.15 |
| 4,773,924 A | 9/1988 | Berkey | 65/3.11 |
| 4,778,237 A | 10/1988 | Sorin et al. | 350/96.15 |
| 4,786,130 A | 11/1988 | Georgiou et al. | 350/96.15 |
| 5,060,307 A | 10/1991 | El-Sherif | 359/173 |
| 5,067,788 A | 11/1991 | Jannson et al. | 385/2 |
| 5,078,465 A | 1/1992 | Dahlgren | 385/50 |
| 5,091,984 A | 2/1992 | Kobayashi et al. | 385/16 |
| 5,106,394 A | 4/1992 | Bramson | 51/309 |
| 5,108,200 A | 4/1992 | Nonaka et al. | 385/16 |
| 5,135,555 A | 8/1992 | Coyle, Jr. et al. | 65/12 |
| 5,136,818 A | 8/1992 | Bramson | 51/165.72 |
| 5,265,178 A | 11/1993 | Braun et al. | 385/24 |
| 5,266,352 A | 11/1993 | Filas et al. | 427/163 |
| 5,290,398 A | 3/1994 | Feldman et al. | 156/651 |
| 5,351,319 A | 9/1994 | Ginder et al. | 385/6 |
| 5,444,723 A | 8/1995 | Chandennet et al. | 372/14 |
| 5,493,629 A | 2/1996 | Stange | 385/125 |
| 5,623,567 A | 4/1997 | Barberio et al. | 385/30 |
| 5,673,351 A | 9/1997 | Clarke et al. | 385/100 |
| 5,781,675 A | 7/1998 | Tseng et al. | 385/30 |
| 5,853,969 A | 12/1998 | Harada et al. | 430/510 |
| 5,966,493 A | 10/1999 | Wagoner et al. | 385/140 |
| 6,011,881 A | 1/2000 | Moslehi et al. | 385/10 |
| 6,095,905 A | 8/2000 | Jameson et al. | 451/41 |
| 6,097,873 A | 8/2000 | Filas et al. | 385/140 |
| 6,191,224 B1 | 2/2001 | Chan et al. | 525/195 |
| 6,205,280 B1 | 3/2001 | Wagoner et al. | 385/140 |
| 6,208,798 B1 * | 3/2001 | Morozov et al. | 385/140 |
| 6,238,274 B1 | 5/2001 | Jameson | 451/41 |
| 6,301,426 B1 | 10/2001 | Jameson et al. | 385/140 |
| 6,303,695 B1 | 10/2001 | Chan et al. | 525/195 |
| 6,335,998 B2 | 1/2002 | Wagoner | 385/140 |
| 6,374,011 B1 | 4/2002 | Wagoner et al. | 385/30 |
| 6,385,383 B1 * | 5/2002 | Marcuse et al. | 385/140 |
| 2002/0018636 A1 * | 2/2002 | Bischel et al. | 385/140 |

FOREIGN PATENT DOCUMENTS

| | | |
|---|---|---|
| EP | 1037090 A2 | 9/2000 |
| EP | 1065821 A2 | 1/2001 |
| GB | 1257825 | 12/1971 |
| GB | 2 184 859 A | 7/1987 |
| GB | 2190211 A | 11/1987 |
| GB | 2184859 | 7/1997 |
| GB | 2351625 | 1/2001 |
| JP | 60-203904 | 10/1985 |
| JP | 06-114713 | 4/1994 |
| WO | WO 87/03676 | 6/1987 |
| WO | WO 89/01171 | 2/1989 |
| WO | WO 93/21245 | 10/1993 |
| WO | WO 95/05617 | 2/1995 |
| WO | WO 00/49434 | 8/2000 |
| WO | WO 00/49438 | 8/2000 |
| WO | WO 00/49439 | 8/2000 |

OTHER PUBLICATIONS

Gowar, J., *Optical Communication Systems*, Ch.3, 58–77 (2d Ed. 1993).

Hussey, C.D. and Minelly, J.D., "Optical Fibre Polishing with a Motor–Driven Polishing Wheel," *Electron. Lett.*24, 805–807 (Jun. 1988).

Kenny, R.P. et al., "Control of Optical Fibre Taper Shape," *Electro. Lett.*27 (18), 1654–1656 (Aug. 1991).

Love, J.D. and Henry, W.M. "Quantifying Loss Minimisation in Single–Mode Fibre Tapers," *Electron. Lett.*22 (17), 912–914 (Aug. 1986).

McCallion, K. J. and Shimazu, M., "Side–Polished Fiber Provides Functionality and Transparency," *Optoelectronics World,*S19, S20, S22 and S24 (Sep. 1998).

Morozov V. et al., "Fused Fiber Optic Variable Attenuator," *OFC 2000, 25$^{th}$Annual Optical Fiber Commincations Conference,*22–24 (Mar. 10, 2000).

Mueller–Westerhoff, U.T. et al., "The Synthesis of Dithiolene Dyes with Strong Near–IR Absorption," *Tetrahedron*47, 909–932 (1991).

Leminger, O.G. and R. Zengerle, "Determination of Single–Mode Fiber Coupler Design Parameters from Loss Measurements," *IEEE J. Lightwave Techn.,*LT–3 (4), 864–867 (Aug. 1985).

Pan, Ru–Pin et al., "Voltage–Controlled Optical Fiber Coupler Using a Layer of a Low–Refractive–Index Liquid Crystal with Positive Dielectric Anisotrophy," *Jpn. J. Appl. Phys.*34, Part 1, No. 12A, 6410–6415 (Dec. 1995).

Parriaux, O. et al., "Distributed Coupling on Polished Single–Mode Optical Fibers," *Appl. Opt.*20, 2420–2423 (Jul. 1981).

Todd, D.A. et al., "Polarization–Splitting Polished Fibre Optic Couplers," *Optical Enginering*32 (9), 2077–2082 (Sep. 1993).

Johnstone, W. et al., "Fibre Optic Modulators Using Active Multimode Waveguide Overlays" *Electronics Letters*, vol. 27, No. 11, pp. 894–896 (May 23, 1991).

Johnstone, W. et al., "Fiber–Optic Fefractometer that Utilizes Multimode Waveguide Overlay Devices," *Optics Letters,*vol. 17, No. 21, pp. 1538–1540 (Nov. 1, 1992).

McCallion, K. et al., "Investigation of Optical Fibre Switch Using Electro–Optic Interlays" *Electronic Letters,*vol. 28, No. 4, pp. 410–411 (Feb. 13, 1992).

Zhang, M. et al., "Single–mode fiber–film directional coupler" *Journal of Lightwave Technology,*vol. LT–5, No. 2, pp. 260–264 (Feb. 1987).

Zang, M. et al., "Single–mode Fiber–Film directional coupler" Journal of Lightwave Technology, vol. LT–5, No. 2, pp. 260–264 (Feb. 1987).

Fink, Donald G. and Christiansen, Donald, *Electronic Engineers' Handbook*, Third Edition, Ch. 24, 14–18 (1989).

Johnstone W. et al., "Fiber Optic Modulators Using Active Multimode Wave Guide Overlays" Electronics Letters, vol. 27, No. 11, pp. 894–896 (May 23, 1991).

McCallion, K. etal. "Investigation of Optical Fibers Switch Using Electro–Optic Interlays" Electronic letters, vol.28, No.4, pp. 410–411 (Feb. 13, 1992).

Technological Arts, Adapt912 Technical Specification Sheet (1999).

Gordon et al., "Single Channel Attenuators," pending U.S. Patent Application Serial No. 09/605,110, filed (Jun. 28, 2000).

Marlow Industries, Inc., "Design Guide –Power Supplies" and "Frequently Asked Questions" www.marlow.com.

* cited by examiner

SINGLE-CHANNEL ATTENUATORS

TECHNICAL FIELD

The present invention relates to fiber optic attenuators for use in single-channel applications, and more particularly to the use of crosslinked siloxane polymers as refractive index matched materials in such devices.

BACKGROUND OF THE INVENTION

Dense wavelength division multiplexed (D/WDM) optical networks increase their transmission capacity by employing multiple co-propagating, discrete, wavelength channels, each carrying independent data streams. Currently, D/WDM systems operate in the 1550 nm spectral region because of the availability of optical amplifiers containing erbium-doped optical fibers (i.e. $Er^{+3}$ fiber). However, as amplifier technology develops, and capacity demands increase, D/WDM systems are expected to expand their spectral extent and increase their channel density.

Broadband fiber optic devices, such as variable attenuators, couplers, and switches having a controllable spectral response, are critical components of D/WDM systems. The availability of dispersion and refractive index controlled polymers can be used to develop side-polished fiber- (SPF) and tapered fiber-based device designs. Examples of such devices and polymers are disclosed in copending commonly assigned U.S. application Ser. Nos. 09/139,787, 09/139,832 and 09/139,457, all filed on Aug. 25, 1998.

In contrast to broadband devices, which are designed to cover a spectral region of tens of nanometers, single-channel or narrowband devices are used in DJWDM systems where single channels are separated out. Certain polymers having a specific refractive index associated therewith at any given single wavelength can be incorporated into such narrowband devices. Classes of polymers, such as polyolefins and polysiloxanes, have excellent optical properties making them ideal for use as optical materials.

In U.S. Pat. Nos. 5,217,811 and 5,266,352, Filas et al. disclose optical devices in which certain crosslinked silicone polymers are incorporated to index match optical components, such as the end of a broken optical fiber, to other optical devices. The polymer disclosed is a vinyl-terminated dimethylsiloxane-diphenylsiloxane copolymer crosslinked with tri- or tetrafunctional silanes in the presence of a platinum catalyst. Examples of refractive index matching applications include coupling the end of one broken optical fiber to another or into a light detector, optical matching a lens to the end of the broken fiber, connecting the end of an optical fiber to a waveguide, and coupling energy from the waveguide into a PIN photodetector. In all these examples, the optical fiber is broken, and the polymer is positioned in series between the components, such that the optical signal is transmitted through the polymer without alteration.

As disclosed in commonly assigned U.S. Pat. No. 5,966,493 and the aforementioned copending commonly assigned patent applications, certain organic polymers having an index of refraction close to that of the fiber can be applied to the side surface of a SPF optic or tapered fiber for use in variable optical attenuators (VOAs). Such attenuators lower the optical signal levels of light transmitted therethrough, without the need to break the optical fiber. The disclosed polymers exhibit a change in refractive index proportional to a change in temperature. OPTI-CLAD® 145, which is available from Optical Polymer Research, Inc. is an example of such a polymer. Polyolefin/dye compositions, wherein the refractive index varies with polymer composition as well as with temperature, are disclosed in the aforementioned copending commonly assigned U.S. application Ser. Nos. 09/139,457 and 09/139,787. These polymers can be used in broadband applications to give a uniform spectral response, but because of the inclusion of the dye, the polyolefin compositions are limited to use in the 1500–1600 nm wavelength region.

A need therefore exists for a polymer composition and optical gel that can attenuate light within a single channel. Furthermore, a polymer composition is desirable wherein the refractive index ($\eta$) can be controlled by changing the temperature of the polymer or by controlling the polymer composition. Such a polymer gel should exhibit good thermal stability, good attenuation control at operating temperatures varying over a wide range, very low $d\eta/dT$, low power consumption, and low polarization dependent loss. The present invention meets the aforementioned needs.

SUMMARY OF THE INVENTION

Accordingly, in one aspect, the present invention is a single-channel attenuator comprising a portion of an optical fiber through which optical energy can propagate, wherein the portion has a side surface through which at least some of the optical energy can be extracted. Overlying the side surface of the optical fiber is a crosslinked siloxane polymer composition, which is the product of crosslinking an uncrosslinked vinyl-terminated dimethylsiloxane-diphenylsiloxane copolymer with a silane crosslinking agent in the presence of a platinum catalyst. The optical energy propagating through the fiber can be controllably extracted therefrom at a particular wavelength by adjusting the refractive index of the crosslinked siloxane polymer composition. Preferably, it should substantially match the refractive index of the optical fiber. As used herein, the term "substantially" matched refers to within about 0.5%, and the term "optical fiber" is interchangeable with the term "fiber optic".

In addition, the attenuator may optionally include a controllable heating/cooling source in contact with the crosslinked siloxane polymer composition (and optionally with the uncrosslinked copolymer to induce curing) wherein the controllable heating/cooling source provides a controllable stimulus to change the temperature of the crosslinked polymer composition, thereby adjusting the refractive index until it substantially matches that of the optical fiber.

In another aspect, the invention is a method for preparing a vinyl-terminated dimethylsiloxane-diphenylsiloxane copolymer having a desired mole percent of phenyl monomers. The method comprises redistributing monomers from a first vinyl-terminated dimethylsiloxane-diphenylsiloxane copolymer and a second vinyl-terminated dimethylsiloxane-diphenylsiloxane copolymer. The method comprises the steps of:

(a) mixing the first vinyl-terminated dimethylsiloxane-diphenylsiloxane copolymer having a higher mole percent of phenyl monomers with the second vinyl-terminated dimethylsiloxane-diphenylsiloxane copolymer having a lower mole percent of phenyl monomers in the presence of a trace amount of an alkaline hydroxide selected from the group of KOH and NaOH; and (b) heating the mixture of step (a) at a temperature and for a time sufficient to produce a clear homogenous solution.

The clear solution contains the vinyl-terminated dimethylsiloxane-diphenylsiloxane copolymer having a desired mole percent of phenyl monomers lying between the higher and lower mole percent.

In yet another aspect, the invention is a fiber optical device for attenuating optical energy (i.e. attenuator) within a single channel, as set forth above. However, the vinyl-terminated dimethylsiloxane-diphenylsiloxane copolymer, which is subsequently crosslinked, is prepared by the redistribution method of the present invention.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DESCRIPTION OF THE PREFERRED EMBODIMENTS

Figure 1:
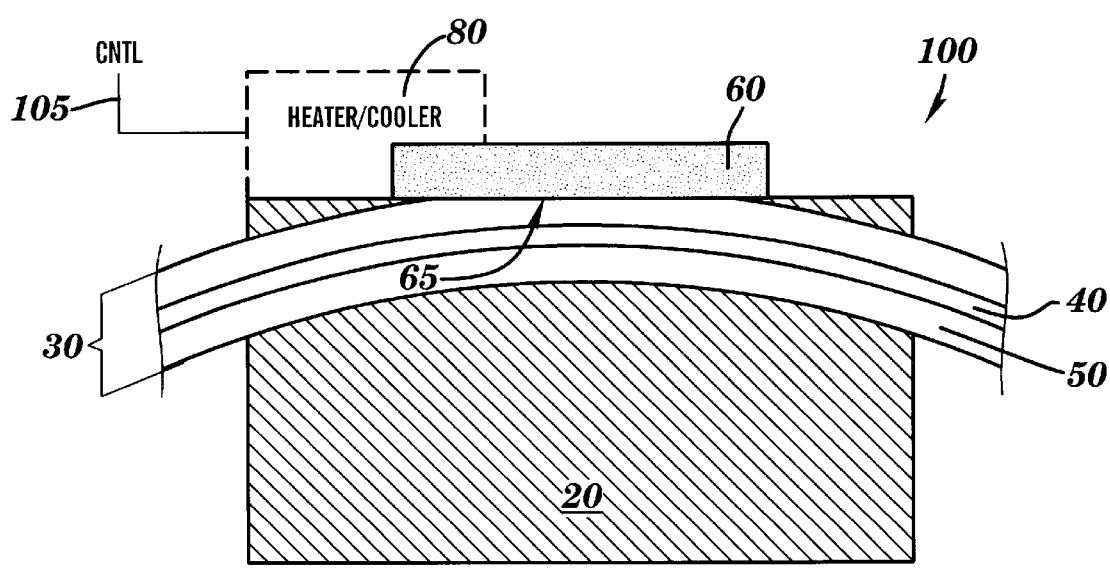
FIG. 1 is a side, cross-sectional view of an attenuator, wherein the optical fiber is mounted in a block, in accordance with the present invention.

The present invention relates to the novel use of crosslinked siloxane copolymers to control the attenuation of light at any single wavelength channel in a fiber optic device. Attenuation of optical energy occurs when the refractive index of the crosslinked siloxane substantially matches that of the optical fiber. The invention includes attenuators, wherein a crosslinked vinyl-terminated dimethylsiloxane-diphenylsiloxane copolymer is formed over a side surface of a portion of an optical fiber to extract optical energy transmitted through the fiber. Detailed descriptions of broadband electronic variable optical attenuators based on a side-polished architecture are described in previously mentioned U.S. Pat. No. 5,966,493 and U.S. application Ser. Nos. 09/139,787 and 09/139,832, and those based on a tapered optical fiber design, are disclosed in copending commonly assigned U.S. application Ser. No. 09/539,467.

Unlike broadband uses, control of the spectral uniformity over a broad wavelength range is unnecessary for single channel applications . In these instances the attenuation may be controlled simply by controlling the refractive index of the coupling medium, which overlies the exposed side surface of the fiber.

In the present invention, the refractive index of the siloxane copolymers (before and after crosslinking) can be individually tailored by controlling the polymer composition, molecular weight, temperature of the material, and the addition of additives. When designing an overlay material for a variable optical attenuator, control of these parameters determines the attenuation of the material system.

The crosslinked polysiloxane polymer composition overlying the side surface of the optical fiber is a product resulting from crosslinking an uncrosslinked vinyl-terminated dimethylsiloxane-diphenylsiloxane copolymer with a silane crosslinking agent in the presence of a platinum catalyst. The vinyl-terminated dimethylsiloxane-diphenylsiloxane copolymer is represented by structural formula (I)

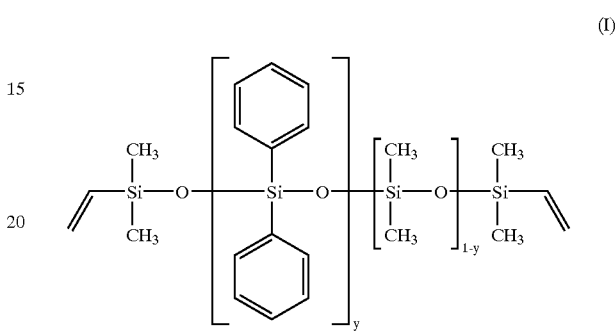

(I)

wherein the monomer

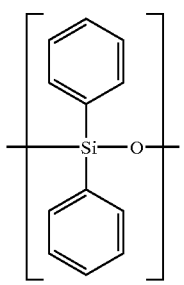

is referred to herein as "Ph$_2$SiO" or "phenyl" unit/monomer. In structure (I), y is the mole fraction of the Ph$_2$SiO monomer, and 1-y is the mole fraction of the (CH$_3$)$_2$SiO monomer. The mole fractions may be converted to mole percent by multiplying by 100%. The refractive index, also referred to as the index of refraction, of the crosslinked polysiloxane composition can be controlled by varying the phenyl group content of polymer (I). Preferably, the phenyl group content ranges from about 7 mole % to about 20 mole %, and more preferably, from about 10–16 mole %. The molecular weight of uncrosslinked polysiloxane (I) is generally between about 1,500 g/mole and 100,000 g/mole, but is preferably from about 20,00 to about 40,000. The crosslinked materials resulting from polymers having the aforementioned phenyl content and molecular weights exhibit refractive indices most useful for index matching with optical fibers. Typically, the refractive index of the uncrosslinked polysiloxane varies very little from that of the crosslinked polymer. However, crosslinking is necessary to produce a gel-like material from the polysiloxane fluid.

Generally, the uncrosslinked polysiloxane should have a refractive index that is close to, but lower than, that of the optical fiber. The refractive index of the optical fiber (commonly referred to as the effective mode refractive index, $n_{eff}$) is dependent upon the fiber core and cladding indices of refraction, and the fiber core dimensions. Usually the effective mode refractive index lies between the core and cladding refractive indices. For a standard glass fiber optic having an 8.3 μm diameter core region of slightly raised refractive index surrounded by a 125±1 μm fused silica cladding, the effective mode refractive index, $n_{eff}$, at 1550 nm is about 1.4461. Typically, variation of phenyl group content and molecular weight provides an uncrosslinked (and later, crosslinked) siloxane copolymer having a refractive index value within about 1% of the effective mode refractive index. For simplicity, the effective mode refractive index will simply be referred to herein as the refractive index of the optical fiber.

Uncrosslinked vinyl-terminated polymers having structure (I) can be obtained commercially from Gelest, Inc., 612 William Leigh Drive, Tullytown, Pa. 19007-6308 and are available in the PDV series, containing 5 mole %, 16 mole % and 30 mole % of the $Ph_2SiO$ units. Alternatively, polymer (I) can be prepared from dimethylsiloxane and diphenylsiloxane to obtain a copolymer with the desired composition of methyl and phenyl groups.

As another alternative, the present invention also provides a novel and unexpected redistribution method for preparing polymer (I), which comprises mixing two vinyl-terminated dimethylsiloxane-diphenylsiloxane copolymers, which are usually two commercially available copolymers. One copolymer has a "higher" phenyl content, one has a "lower" phenyl content, and the resulting copolymer (I) has a phenyl content between that of the higher and lower. The method includes mixing the two copolymers in the presence of a trace amount 45% KOH or 50% NaOH, then heating the mixture up to 160° C. for about 15 minutes. Previously, prior to this invention, attempts to mix the copolymers resulted in cloudiness. However, in the present method, the cloudy mixture turns to a homogeneous solution. The KOH or NaOH initiates a redistribution of the two silicone fluids. An example of the method, described below in Example 1, involves producing a copolymer (I) containing 11 mole % $Ph_2SiO$ units from polysiloxane copolymers containing 5 mole % and 16 mole % $Ph_2SiO$ units, respectively.

Useful crosslinking agents include tetrafunctional and trifunctional silanes. Particular silane crosslinking agents which result in crosslinked materials having excellent optical and thermal properties are polyphenyl-(dimethylhydrosiloxy)siloxanes and 1,3-diphenyl-1,1,3,3-tetrakis(dimethylsiloxy)disiloxane. Mixtures of the agents can also be used to crosslink vinyl-terminated polymer (I). Polyphenyl-(dimethylhydrosiloxy) siloxanes may be represented by structure (II)

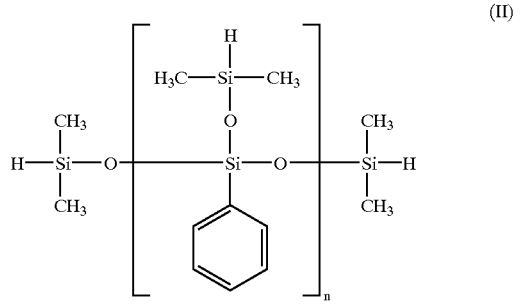

where n is an integer from 1 to 4. 1,3-Diphenyl-1,1,3,3-tetrakis(dimethylsiloxy) disiloxane is given by structure (III)

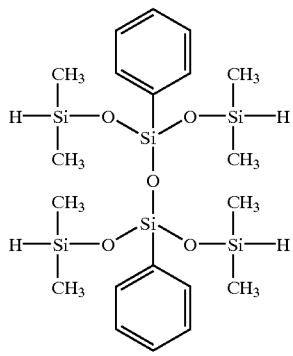

Silane crosslinking agents (II) and (III) are commercially available from Gelest, Inc.

The platinum catalyst, such as platinum-cyclovinylmethyl-siloxane complex available from Gelest, Inc., should be miscible with the starting materials. The amount of catalyst ranges from about 50 ppm to about 100 ppm by weight of the complex, but preferably ranges from about 65 to about 80 ppm. This complex contains about 3.0% platinum, so in terms of platinum, the preferred range is from about 1.5 to 3 ppm Pt. The procedure for carrying out the crosslinking reaction is fully set forth in the aforementioned U.S. Pat. Nos. 5,266,352 and 5,217,811. The resulting crosslinked siloxane copolymer (after curing) exhibits good optical properties and good gel-type integrity.

The ratio of the crosslinking agent to the vinyl-terminated copolymer (I) is generally given in terms of the number of hydride groups on the crosslinking agent to the number of vinyl groups on the vinyl-terminated siloxane polymer (I) (hydride:vinyl ratio). For a suitable overlay in a variable optical attenuator, the crosslinked product should be a gel, and the preferred ratio should range from about 0.55:1 to about 1.50:1, with about 0.65:1 to about 0.85:1 being the most preferred ratio range.

Prior to performing the crosslinking reaction, it is often desirable to add a catalyst inhibitor to extend the pot life at room temperature. A suitable inhibitor available from Gelest as SIT7900.0 is 1,3,5,7-tetravinyl-1,3,5,7-tetramethyl cyclotetrasiloxane having structural formula (IV)

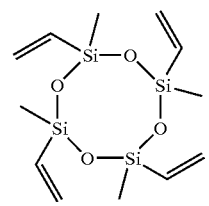

However, other inhibitors may be used, as will be obvious to those of skill. The molar ratio of inhibitor to platinum in the catalyst (inhibitor:Pt ratio) varies from about (25–60):1. The optimum ratio range is about (50–55):1. Addition of the inhibitor extends the pot life at room temperature from about 0.5–1 hour to about 3 or 4 hours.

Prior to curing, vinyl-terminated dimethylsiloxane-diphenylsiloxane copolymer (I), Pt catalyst, and inhibitor (IV) are mixed together, then crosslinking agent (II), (III), or a mixture thereof, is added, and the mixture stirred and degassed. After gelling has begun (i.e. when the material no longer flows after the crosslinker has been added), the siloxane copolymer gel is applied as an overlay to the exposed side surface of a portion of the optical fiber through which optical energy is to be extracted. A controllable heating/cooling source is in contact with the polysiloxane overlay providing a stimulus to alter the temperature of the overlay. The material is heated at a temperature and for a time sufficient for curing, then cooled. The refractive index of the resulting crosslinked siloxane copolymer can then be adjusted as necessary by varying the temperature of the material. An increase in the temperature of the polymer will lower the refractive index, and a decrease in the temperature of the polymer will increase the refractive index. Advantageously, the same controllable heating/cooling source that was used to cure and cool the material can also be used to heat or cool the crosslinked polysiloxane copolymer to adjust the refractive index of the crosslinked polymer, preferably, to substantially match that of the fiber.

For use as an overlay in a variable optical attenuator, control of the $Ph_2SiO$ content in the uncrosslinked polysiloxane copolymer (mole % $Ph_2SiO$ units), molecular weight, and temperature determines the refractive index of the polymer and therefore provides attenuation control of the material system. Initially, the refractive index of the uncrosslinked copolymer (I) (and thus, the crosslinked polymer) can be controlled to be lower than that of the underlying side-polished fiber ($n_{eff}$) so that little or no attenuation of light occurs. After the copolymer mixture is applied onto the side surface of the fiber, the temperature of the polymer overlay is then increased from its initial temperature to about 80° C. for curing. The elevated temperature is held for about 5 minutes until curing is complete. Because the refractive index was controlled initially to be lower than that of the fiber, the cured crosslinked siloxane composition is cooled down to about 25° C. until attenuation begins. The accompanying increase in the polymer's refractive index upon cooling causes attenuation of light in the fiber when the refractive index of the crosslinked siloxane polymer is substantially close to or slightly above that of the fiber (within about 0.5%). The temperature at which attenuation begins at a particular wavelength is dependent upon the refractive index of the crosslinked polymer. This effect of temperature on refractive index can therefore be used to control the variable attenuation of light in an optical fiber.

Consideration will now be given to the preparation of useful siloxane polymer compositions and devices with preferred parameters and illustrative methods. Unless otherwise indicated, the reactants and reagents used in the reactions described below are readily available materials. Such materials can be conveniently prepared in accordance with conventional preparatory procedures or obtained from commercial sources. Optical characterization of the crosslinked polymer compositions described herein was done by applying the uncrosslinked polymer mixture as an overlay on a side-polished optical fiber, followed by heating to induce crosslinking, then cooling. Optical characterization included measurement of the temperature at which the crosslinked polymer overlay caused attenuation, and range of attenuation possible. In addition, it should be noted that the embodiments included and described herein are for illustrative purposes only, and the invention is in no way limited to the embodiments used in the examples.

Process temperatures in the crosslinking reaction are not critical and can vary widely. The crosslinking reaction may be conducted at room temperature or, alternatively at elevated temperatures up to about 100 ° C. Preferably, the crosslinking temperature ranges from about 70° C. to about 80° C. Crosslinking/curing is carried out over a period of time sufficient to produce the desired crosslinked polymer in adequate yield. Reaction times are influenced by the reactants, reactant temperature, the concentration of the reactants, catalyst, and other factors known to those of skill in the art.

EXAMPLE 1

Redistribution Synthesis of Copolymer (I)

Vinyl-terminated dimethylsiloxane-diphenylsiloxane copolymer containing 16 mole % $Ph_2SiO$ units (16 g) was weighed out into a glass vial. To this was added 10 g of vinyl-terminated dimethylsiloxane-diphenylsiloxane copolymer containing 5 mole % $Ph_2SiO$ units. The weight ratio of the two copolymers was 1.6:1. To this fluid mixture was added 200 µL of 45% KOH. The mixture was heated up to 160° C. for 15 minutes, and the initially cloudy mixture changed to a clear homogenous solution. Then 1mL vinyldimethyl chlorosilane (chain terminator) and 10 mL $MeCl_2$ were added. The solution was extracted with $H_2O$ to remove residual base, then dried in a vacuum oven at 100° C. overnight. A redistribution of the two siloxane fluids occurred, and the resulting vinyl-terminated dimethylsiloxane-diphenylsiloxane copolymer contained 11 mole % $Ph_2SiO$ units and had a molecular weight of about 33,000 g/mole. The refractive index at 589 nm and 25° C. was about 1.4545.

EXAMPLE 2

2.0076 Grams of vinyl-terminated dimethylsiloxane-diphenylsiloxane copolymer (11 mole % $Ph_2SiO$ units) from Example 1 were weighed into a glass vial. Platinum-cyclovinylmethyl-siloxane complex, 4.0 gL (69 ppm), and 1,3,5,7-tetravinyl-1,3,5,7-tetramethyl cyclotetrasiloxane, 5.0 µL, were added to the vial. The contents were stirred with a magnetic stirrer for about 15 minutes, then degassed. To this, 29.8 µL of polyphenyl-(dimethylhydrosiloxy) siloxane, the hydride terminate, was added, and the resulting material was stirred vigorously for 10 minutes, then degassed and purged with argon to remove any air bubbles. After the material was no longer fluid, the gel was applied to the side surface of an optical fiber.

EXAMPLE 3

Vinyl-terminated dimethylsiloxane-diphenylsiloxane copolymer (1.999 g) was weighed into a glass vial. Platinum-cyclovinylmethyl-siloxane complex, 4.5 µL, and 1,3,5,7-tetravinyl-1,3,5,7-tetramethyl cyclotetrasiloxane, 5.6 µL, were added to the vial. The contents were stirred with a magnetic stirrer for about 15 minutes, then degassed. To this, 59 µL of polyphenyl-(dimethylhydrosiloxy) siloxane, the crosslinker, were added, and the resulting material was stirred vigorously for 10 minutes, then degassed. The refractive index at 589 nm and 25° C. was about 1.4491. This mixture had a pot life of 2–4 hours at room temperature. During that time a narrowband variable optical attenuator was assembled, then the crosslinked polymer was applied as an overlay on the exposed side surface of the optical fiber.

In accordance with the present invention, FIG. 1 is a side, cross-sectional view of an attenuator 100 for attenuating optical energy within a single channel. Shown in FIG. 1, is a portion of a single-mode optical fiber (e.g., telecommunications Corning SMF-28) 30 having a side surface 65 through which at least some of the optical energy propagating through the fiber can be extracted. The fiber is typically side-polished through its cladding 50 close to its core 40, thereby exposing, through side surface 65, an evanescent tail of the optical energy transmitted in the fiber. The remaining cladding thickness is generally<about 10 μm. Alternatively, the side surface of the portion of the fiber may be tapered (not shown), as disclosed in copending commonly assigned U.S. application Ser. No. 09/539,467 filed on Mar. 30, 2000. However, the invention is not limited to the use of side-polished optical fibers or tapered fibers, and other fibers having a side surface through which optical energy can be extracted may be used. Fiber 30 has a refractive index at any particular wavelength, such as the useful 1310 nm and 1550 nm.

As shown in FIG. 1, where the fiber has been side-polished, siloxane polymer composition 60 comprising a mixture of vinyl-terminated dimethylsiloxane-diphenylsiloxane copolymer (I), a silane crosslinking agent (II) or (III), a platinum catalyst, and optionally an inhibitor (IV), as described above, overlies side surface 65 of the fiber cladding. As previously mentioned, the refractive index of the siloxane polymer composition, both crosslinked and uncrosslinked, may be controlled to be lower than the effective mode refractive index of the fiber (preferably within 1%) by adjusting the molar % of the $Ph_2SiO$ units in structure (I) or by controlling the molecular weight of structure (I).

Using a heating/cooling source 80 in operative contact with mixture 60, the overlay material is heated to a temperature high enough to induce crosslinking and held there until crosslinking/curing is complete. Such temperatures preferably range from about 70° C. to about 80° C. However, curing can occur at any temperature up to about 100° C., but the cure time will decrease as the temperature of the composition is increased. At 80° C., the material will cure in about 3 to 5 minutes.

In addition to the heating/cooling source 80, a sensor (not shown) can be placed in material 60, to measure the resultant temperature thereof. The signal representing the temperature can be carried from the device using sense leads (not shown), and controllable heating/cooling source 80 can be operated using control lead 105. In one exemplary embodiment, controllable heating/cooling source 80 is a thermoelectric cooler (TEC) (Melcor part number FC0.45-4-05), and the thermal sensor is a thermistor (Fenwell Electronics part number 112-503JAJ-B01). However, the invention is not limited to the use of these appliances, as will be obvious to those of skill.

After curing, the temperature of the crosslinked siloxane composition 60 is lowered to about 25° C., for example, using controllable heating/cooling source 80. The refractive index of the crosslinked material is controllably varied by controllably changing the temperature of the composition with controllable heating/cooling source 80 until it is substantially the same as that of the side-polished fiber's corresponding refractive index ($n_{eff}$) at the particular wavelength of interest. As previously stated, an increase in temperature will decrease the refractive index of crosslinked siloxane copolymer 60, and a decrease in temperature will cause an increase. In a variable optical attenuator, maximum optical energy can be extracted from the fiber when the refractive index of the crosslinked siloxane composition is substantially the same as that of the fiber. Advantageously, controllable heating/cooling source 80 can be used both to effect crosslinking/curing and to optimize the refractive index of material 60.

After index matching, optical energy propagating through the fiber can then be extracted from the fiber core by crosslinked polymer composition 60, and attenuation of the optical signal will occur. (Note that the crosslinked siloxane composition overlay and the siloxane copolymer mixture overlay, prior to curing, are both referred to in FIG. 1 as reference number 60).

Side-polished optical fiber 30 of FIG. 1 may be fabricated by lapping and polishing techniques. Using this technique, the fiber is typically embedded in a fused silica substrate block 20 containing a controlled radius groove. Material is carefully removed from a portion of fiber cladding 50 until core 40 is approached. At this point, the evanescent field of the optical energy propagating through the optical fiber can be accessed through surface 65 and propagate through crosslinked polymer composition 60. The device interaction length can be controlled by the remaining cladding thickness and the groove's radius of curvature.

Alternatively, side-polished optical fiber 30 may be fabricated without the incorporation of substrate block 20 by the technique disclosed in the aforementioned copending commonly assigned U.S. Ser. Nos. 09/139,787 and 09/139,832.

The single-channel attenuating device of the present invention may be used in connection with the architectural designs disclosed in U.S. Pat. No. 5,966,493, wherein the portion of the optical fiber is embedded in a block, as shown in FIG. 1, and in copending commonly assigned U.S. Ser. Nos. 09/139,787 and 09/139,832, wherein the portion of the optical fiber is suspended in a housing. This latter design is illustrated in FIG. 2.

Figure 2:
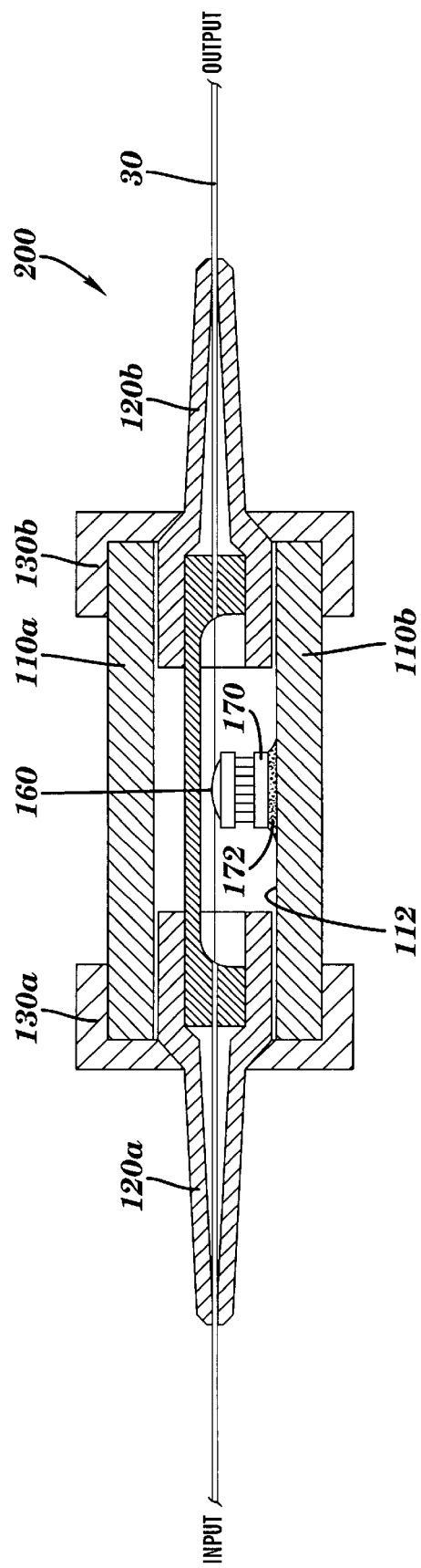
FIG. 2 is a side, cross-sectional view of an attenuator, wherein the optical fiber is suspended from a housing, in accordance with the present invention.

FIG. 2 shows attenuator 200 in side, cross-sectional view. A housing comprising, in one example, strain reliefs 120a and 120b, end caps 130a and 130b, and shell pieces 110a and 110b is provided to accommodate the input and output sections of the fiber, as well as additional, internal components. Crosslinked siloxane copolymer 160 (after curing) is shown in contact with the suspended, side-polished portion of fiber optic 30, and with an underlying controllable heating/cooling source 170 (TEC) which is mounted, via a thermally conductive epoxy 172, to an inside wall 112 of shell piece 110b. Note that fiber 30 may be completely suspended by the housing and completely surrounded by the polymer as shown, or the fiber may directly contact heating/cooling source 170 with the remainder surrounded by the polymer (not shown). A nonthermal-sinking structure (not shown) may be used to contain the polymer over the portion of the fiber.

As discussed above, a sensor (not shown) can be placed in material 160 (60, FIG. 1) to measure the resultant temperature thereof. The optical energy level can be extracted from this temperature measurement by reference to predetermined device characteristics. The fiber can also be directly tapped with sensor(s) to directly measure the optical energy therein (by, e.g., demodulation) before/after attenuation. The signals representing the temperature and/or optical energy levels can be carried from the device using sense leads (not shown). These signals can be used in a feedback loop to control the temperature of the heating/cooling source 170 (80, FIG. 1) using lead 105 of FIG. 1, and the desired level of optical energy in the fiber can therefore be attained in a variable manner during device operation.

As shown in FIG. 2, the suspension of the portion of the fiber 30 and siloxane copolymer 160, without any other significant thermal contacts, results in an efficient, thermally insulated attenuation device such that any changes in temperature induced by the controllable heating/cooling source 170 are transferred solely, and quickly, to uncrosslinked or crosslinked siloxane copolymer material 160, but to no other surrounding structures.

This "blockless" technique stands in contrast to the prior technique described above in connection with FIG. 1, wherein the fiber is mounted in a block, and any thermal changes in the material are also affected by the heat sink characteristics of the block within which the side-polished fiber is mounted, and on which the material is formed. In the suspended fiber approach, the heat sink effect of surrounding structures is minimized, and faster and more predictable control of the temperature, and therefore the optical attenuating effects, are provided.

EXAMPLE 4

Fiber Optic Performance of Attenuator with Crosslinked Siloxane Overlay

An electronic variable optical attenuator having a suspended side-polished fiber optic as described above was built. It included a TEC as a heat/cooling source. The active optical overlay material consisted of the crosslinked siloxane polymer from Example 3.

Figure 3:
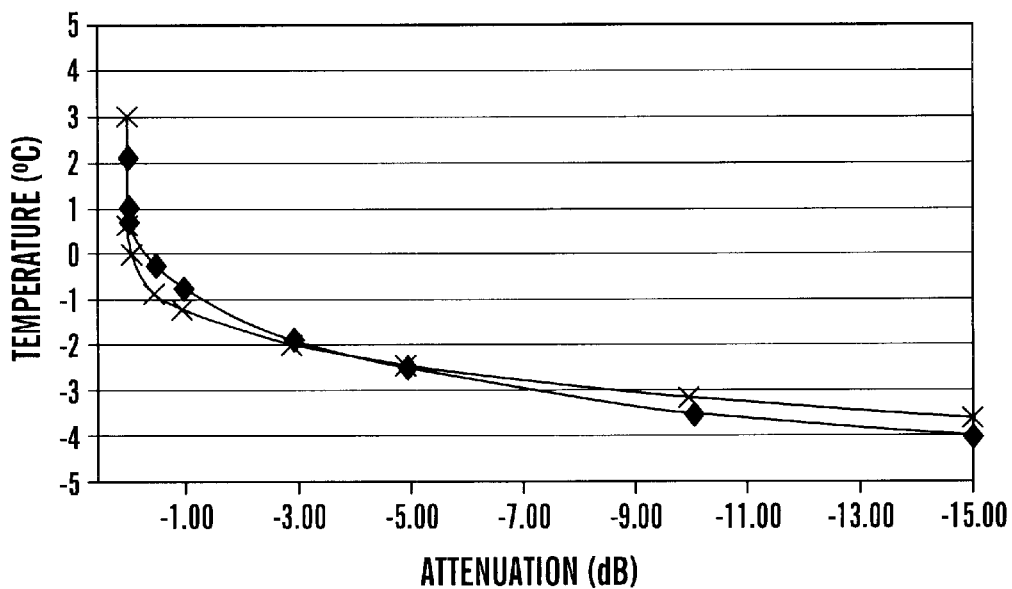
FIG. 3 is a graph depicting the temperature (° C.) versus attenuation in decibels (dB) for a crosslinked siloxane copolymer composition overlying the suspended fiber of FIG. 2.

The attenuator was tested at 1550 nm with attenuation levels calibrated between 0 and −15 dB. The attenuator had a connector loss of 0.1 dB at 22° C., with an optical test power of 8.5 mW. An attenuation of −3 dB was achieved at −2.0° C. A plot of the attenuation versus temperature for this device is shown in FIG. 3. Full attenuation from 0 to −15 dB was achieved with a temperature range of approximately 10° C.

EXAMPLE 5

Figure 4:
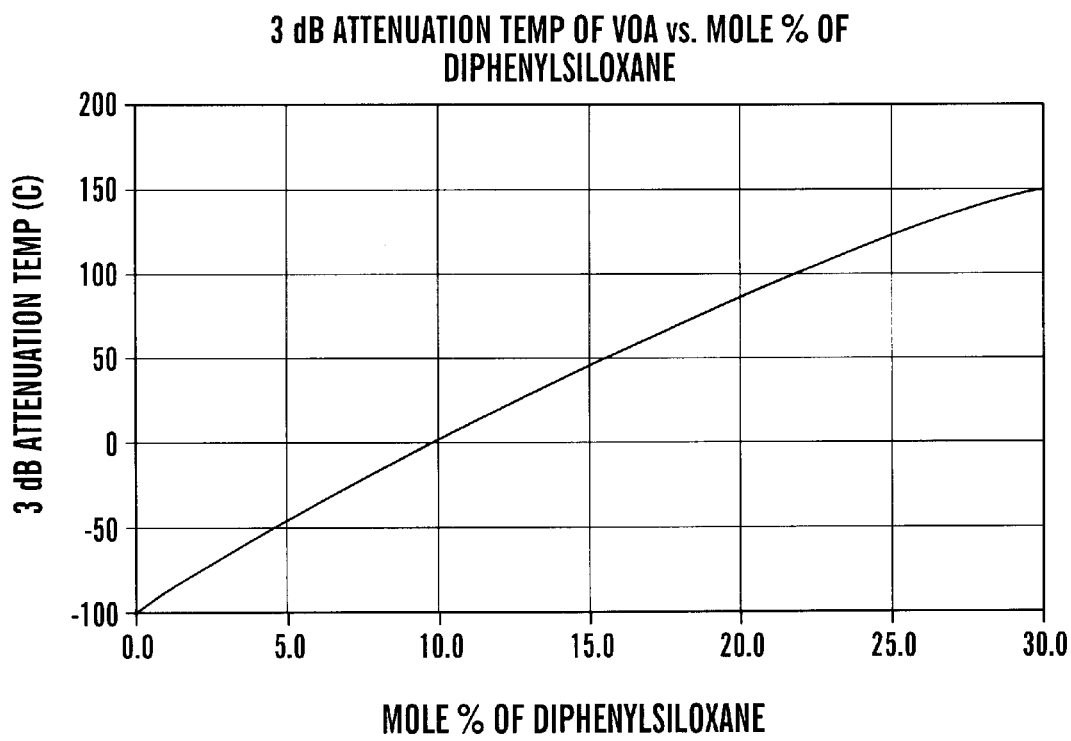
FIG. 4 is a graph depicting the attenuation in decibels (dB) versus mole % Ph$_2$SiO units contained in a vinyl-terminated dimethylsiloxane-diphenylsiloxane copolymer in accordance with the present invention.

The procedure of Examples 2 and 3 were followed to prepare crosslinked siloxane copolymers from polymers of structure (I) having various mole percents of $Ph_2SiO$ monomers. Based on the refractive indices, the relationship between 3 dB attenuation (VOA devices prepared according to Example 3) and the mole percent of $Ph_2SiO$ units in the uncrosslinked structure (I) can be obtained. This data is provided in FIG. 4, which is a plot of the temperature at which 3 dB attenuation occurs vs. the mole % of $Ph_2SiO$ units in the corresponding polymer starting material (I). This plot is useful for directing synthetic methods to achieve the correct silicone fluid for the desired operating temperature.

Each of the patents and pending patent applications cited herein is incorporated by reference herein in its entirety.

While the invention has been particularly shown and described with reference to preferred embodiment(s) thereof, it will be understood by those skilled in the art that various changes in form and details may be made therein without departing from the spirit and scope of the invention.

We claim:

1. An attenuator for use within a single channel comprising:
   (a) a portion of an optical fiber through which optical energy can propagate, wherein said portion has a side surface through which at least some of said optical energy can be extracted; and
   (b) a crosslinked siloxane polymer composition overlying said side surface, wherein said crosslinked siloxane polymer composition is produced by crosslinking a vinyl-terminated dimethylsiloxane-diphenylsiloxane copolymer with a silane crosslinking agent in the presence of a platinum catalyst; and
   wherein said optical energy can be controllably extracted from said optical fiber within said single channel by adjusting the refractive index of said crosslinked siloxane polymer composition.

2. The attenuator of claim 1, wherein said refractive index of said crosslinked siloxane polymer can be adjusted by controlling the mole percent of phenyl group ($Ph_2SiO$) monomers in said uncrosslinked copolymer, by controlling the molecular weight of said uncrosslinked copolymer, or by controlling the temperature of said crosslinked siloxane polymer composition.

3. The attenuator of claim 2, wherein the mole % of said phenyl group monomers in said uncrosslinked copolymer is controlled to lie within the range from about 7 mole % to about 20 mole %.

4. The attenuator of claim 3, wherein the mole % of said phenyl group monomers in said uncrosslinked copolymer is controlled to lie within the range from about 10 mole % to about 16 mole %.

5. The attenuator of claim 2, further comprising a controllable heating/cooling source in contact with said crosslinked siloxane polymer composition, wherein said controllable heating/cooling source provides a controllable stimulus to said crosslinked polymer composition to change the temperature thereof and to adjust the refractive index of said crosslinked siloxane polymer composition.

6. The attenuator of claim 5, wherein prior to crosslinking, said controllable heating/cooling source is in operative contact with said vinyl-terminated dimethylsiloxane-diphenylsiloxane copolymer, said silane crosslinking agent, and said platinum catalyst, and wherein said controllable heating/cooling source provides a controllable stimulus to change the temperature thereof and to initiate and complete said crosslinking.

7. The attenuator of claim 1, further comprising 1,3,5,7-tetravinyl-1,3,5,7-tetramethyl cyclotetrasiloxane as an inhibitor.

8. The attenuator of claim 7, wherein the molar ratio of inhibitor to platinum in the catalyst (inhibitor:Pt ratio) ranges from about 25:1 to about 60:1.

9. The attenuator of claim 8, wherein the ratio ranges from about 50:1 to about 55:1.

10. The attenuator of claim 1, wherein said refractive index of said crosslinked siloxane polymer composition is controlled to lie within about 0.5% of said refractive index of said optical fiber.

11. The attenuator of claim 1, wherein said silane crosslinking agent is selected from the group of polyphenyl-(dimethylhydrosiloxy)siloxanes, 1,3-diphenyl-1,1,3,3-tetrakis(dimethylsiloxy)disiloxane, and mixtures thereof.

12. The attenuator of claim 1, wherein said platinum catalyst is platinum-cyclovinylmethyl-siloxane complex.

13. The attenuator of claim 1, wherein the ratio of hydride groups in said silane crosslinking agent to vinyl groups in said uncrosslinked copolymer (hydride:vinyl) ranges from about 0.55:1 to about 1.50:1.

14. The attenuator of claim 13, wherein said hydride:vinyl ratio ranges from about 0.65:1 to about 0.85:1.

15. The attenuator of claim 1, wherein said portion of said optical fiber is suspended in a housing.

16. The attenuator of claim 1, wherein said portion of said optical fiber is mounted in a block.

17. An attenuator for attenuating optical energy within a single channel comprising:
   (a) a portion of an optical fiber through which optical energy can propagate, wherein said portion has a side surface through which at least some of said optical energy can be extracted; and
   (b) a crosslinked siloxane polymer composition overlying said side surface, wherein said crosslinked siloxane polymer composition is produced by crosslinking a vinyl-terminated dimethylsiloxane-diphenylsiloxane copolymer having a desired mole percent of phenyl groups with a silane crosslinking agent in the presence of a platinum catalyst;

wherein said vinyl-terminated dimethylsiloxane-diphenylsiloxane copolymer is prepared by (i) mixing a first vinyl-terminated dimethylsiloxane-diphenylsiloxane copolymer having a higher mole percent of phenyl monomers with a second vinyl-terminated dimethylsiloxane-diphenylsiloxane copolymer having a lower mole percent of phenyl monomers in the presence of a trace amount of an alkaline hydroxide selected from the group of KOH and NaOH; and (ii) heating the mixture of step (i) at a temperature and for a time sufficient to provide a clear homogenous solution containing said vinyl-terminated dimethylsiloxane-diphenylsiloxane copolymer, wherein said desired mole percent of phenyl monomers lies between said higher mole percent and said lower mole percent; and wherein said optical energy can be controllably extracted from said optical fiber within said single channel by adjusting the refractive index of said crosslinked siloxane polymer composition.

* * * * *